(12) United States Patent
Callierotti et al.

(10) Patent No.: US 7,691,927 B2
(45) Date of Patent: Apr. 6, 2010

(54) SELF-EMULSIFYING LIQUID STABILIZERS

(75) Inventors: Corrado Callierotti, Seritae (IT);
Jonathan Simon Hill, Manchester (GB)

(73) Assignee: Chemtura Europe GmbH, Frauenfeld (CH)

( * ) Notice: Subject to any disclaimer, the term of this patent is extended or adjusted under 35 U.S.C. 154(b) by 247 days.

(21) Appl. No.: 11/659,686

(22) PCT Filed: Jul. 26, 2005

(86) PCT No.: PCT/GB2005/002924

§ 371 (c)(1),
(2), (4) Date: Feb. 6, 2007

(87) PCT Pub. No.: WO2006/018597

PCT Pub. Date: Feb. 23, 2006

(65) Prior Publication Data

US 2007/0254992 A1    Nov. 1, 2007

(30) Foreign Application Priority Data

Aug. 17, 2004  (GB) ................................ 0418312.5

(51) Int. Cl.
*C08K 5/526*  (2006.01)
*C08K 5/5333*  (2006.01)

(52) U.S. Cl. ........................ 524/126; 524/128; 524/133; 524/147; 524/153; 524/323

(58) Field of Classification Search ................ 524/126, 524/128, 133, 147, 153, 323–353
See application file for complete search history.

(56) References Cited

U.S. PATENT DOCUMENTS

| | | | | |
|---|---|---|---|---|
| 3,080,338 A | * | 3/1963 | Nudenberg et al. | 524/153 |
| 3,676,410 A | * | 7/1972 | Bauer et al. | 526/329.2 |
| 3,699,173 A | * | 10/1972 | Osberg et al. | 568/609 |
| 3,824,205 A | * | 7/1974 | Demarcq et al. | 524/149 |
| 5,186,993 A | * | 2/1993 | Hallden-Abberton et al. | 428/36.92 |
| 5,334,644 A | * | 8/1994 | Gose et al. | 524/487 |
| 6,596,796 B1 | * | 7/2003 | Meier et al. | 524/291 |
| 7,387,674 B1 | * | 6/2008 | Yi | 106/669 |

* cited by examiner

*Primary Examiner*—Peter Szekely
(74) *Attorney, Agent, or Firm*—Katten Muchin Roseman LLP

(57) ABSTRACT

A process for stabilising a natural or synthetic organic polymer or copolymer obtained from a water based latex or emulsion of the polymer or copolymer comprising adding to the later or emulsion prior to coagulation of the polymer or copolymer a substantially water-free self-emulsifying liquid stabiliser mixture comprising (a) a phosphite or phosphonite stabiliser; (b) a phenolic antioxidant and (c) an emulsifying agent. The preferred stabiliser package is a blend of 2 parts by weight liquid phosphite stabiliser to 1 part by weight liquid phenolic antioxidant which has dissolved in it a fatty acid ester emulsifier.

19 Claims, No Drawings

SELF-EMULSIFYING LIQUID STABILIZERS

This invention relates to a process for stabilising natural or synthetic organic polymers or copolymers against degradation caused by oxygen, heat and/or light.

More particularly, this invention relates to a process for stabilising natural or synthetic organic polymers or copolymers which are obtained from water-based emulsions or latexes of the monomer or monomers, e.g. styrene/butadiene rubber (SBR).

A traditional process for the manufacture of SBR is carried out by emulsifying the styrene and butadiene liquid monomers in water at low temperature (40 to 60° C. depending on the grade of SBR) and using a radical catalyst for the polymerisation reaction. The emulsifier used is normally a water soluble salt of a fatty acid (a soap). The copolymer thus formed remains finely dispersed in the water phase giving the liquid dispersion a milky appearance (the so called "latex"). When the copolymer reaches the desired concentration, the catalyst is destroyed and unreacted monomers are recovered by distillation leaving a copolymer latex.

A stabiliser/antioxidant blend in emulsion form is normally added to the copolymer latex either before or after distillation of the unreacted monomers and before copolymer coagulation in order to obtain maximum incorporation of the stabiliser/antioxidant blend into the copolymer. The copolymer is coagulated with decomposition of most of the emulsifier by decreasing the pH of the emulsion by the addition of an acid or salty solution. By salty solution is meant a water solution of an electrolyte able to destroy the emulsion and generate the coagulation, (e.g. aluminium sulphate solution).

Since traditional stabiliser/antioxidant blends are neither soluble in nor easily dispersable in water it is necessary that a stable emulsion (the "mother" emulsion) of the stabiliser/antioxidant blend is prepared beforehand so that it is on hand ready for feeding into the copolymer latex before coagulation of the copolymer.

The mother emulsion of the stabiliser/antioxidant blend can be prepared on-site in a separate vessel containing water which is maintained under constant stirring and heated up to approximately 50° C. Potassium or sodium hydroxide, in 50% water solution, is added and mixed with the water. An appropriate amount of stabiliser/antioxidant blend is heated up in a separate vessel under stirring and the required amount of fatty acid emulsifying agent is dissolved in the stabiliser/antioxidant blend forming a clear solution. This clear solution is poured into the aqueous alkaline (KOH or NaOH) solution to obtain an oil-in-water emulsion. This oil-in-water mother emulsion is kept under constant stirring and fed into the copolymer latex at a predetermined rate in order to obtain the correct stabiliser/antioxidant blend in the final copolymer. This on-site mother emulsion production presents a considerable disadvantage to the polymer compounder because (i) he must maintain a stock of chemicals suitable for use in producing the mother emulsions; (ii) he must be careful in formulating the mother emulsions in order that they will be stable; (iii) he must expend heat energy to reduce viscosity in order to produce stable aqueous emulsions and (iv) he must consume a considerable amount of valuable time in emulsifying the water-immiscible stabilisers and antioxidants before they can be used in latex polymer compounding. The alternative to on-site mother emulsion production is for the stabiliser/antioxidant manufacturer to supply this to the polymer compounder in stable aqueous emulsion form ready for use and this is commercially impractical because the rubber compounder is unduly burdened with high shipping, handling and storage costs brought on by the high water content of the aqueous emulsions.

An object of the present invention is to provide a stabilising process which overcomes the disadvantages of the above described traditional process.

According to the present invention there is provided a process for stabilising a natural or synthetic organic polymer or copolymer obtained from a water based latex or emulsion of the polymer or copolymer comprising adding to the latex or emulsion prior to coagulation of the polymer or copolymer a substantially water-free self-emulsifying liquid stabiliser mixture comprising (a) a phosphite or phosphonite stabiliser; (b) a phenolic antioxidant and (c) an emulsifying agent.

Preferably, the phosphite or phosphonite stabiliser and the phenolic antioxidant are liquid at room temperature, molten between 50 and 120° C. or are used in solution.

Further preferably, the phosphite stabiliser is liquid at room temperature and is selected from one or more of the following:

Tris nonylphenyl phosphite
Tris dinonylphenyl phosphite
2,4-Dinonylphenyl bis(4-nonylphenyl)phosphite
Triphenyl phosphite
Tris(methylphenyl)phosphite
Diphenyl isodecyl phosphite
Phenyl diisodecyl phosphite
Triisodecyl phosphite
Diphenyl isooctyl phosphite
Phenyl diisooctyl phosphite
Triisooctyl phosphite
Tri(tridecyl)phosphite
Tristearyl phosphite
Trilauryl phosphite
2-Butoxyethyl diisodecyl phosphite
2-Ethylhexyl diphenyl phosphite
Tri 2-ethyhexyl phosphite
Bis(2-ethylhexyl)nonylphenyl phosphite
Tetraphenyl dipropylene glycol diphosphite
Tris(dipropylene glycol)phosphite
Poly(dipropyleneglycol)phenyl phosphite
Alkyl($C_{12-15}$)bisphenol A phosphite
Alkyl($C_{10}$)bisphenol A phosphite The most preferred liquid phosphite is Tris(4-n-nonylphenyl)phosphite (Alkanox TNPP).

Further preferably, the phosphonite stabiliser is Tetrakis(2, 4-di-tert-butylphenyl) 4,4'-biphenylene diphosphonite (Alkanox 24-44) melting in the range 75° C. to 95° C.

The phenolic antioxidant preferably is liquid at room temperature and is a mixture of $C_{13}$-$C_{15}$ linear and branched alkyl esters of 3-(3',5'-di-t-butyl-4'-hydroxyphenyl)propionic acid (Anox 1315), octyl 3-(3',5'-di-t-butyl-4'-hydroxyphenyl)propionate (Irganox 1135), 2,2'-methylene bis(4-methyl-6-nonylphenol)(Naugard 536), 2,6-bis(alpha-methylbenzyl)-4-methylphenol (Naugard 431), styrenated phenol (mixture of mono-, di- and tri) (Naugard SP), 2,4-dimethyl-6-(1-methylpentadecyl)phenol and tocopherols (any compound having the basic tocopherols structure of the Vitamin E group).

The phenolic antioxidant also may be a soluble antioxidant such as 1,1,3-Tris(2'-methyl-4'-hydroxy-5'-t-butylphenyl) butane (Lowinox CA22) (CAS No 1843-03-4), the polymeric sterically hindered phenol (Lowinox CPL) (CAS No 68610-51-5) or octadecyl 3-(3',5'-di-t-butyl-4'-hydroxyphenyl)propionate (Anox PP 18).

The emulsifying agent can be a non-ionic surfactant; an anionic surfactant; a cationic surfactant or an amphoteric surfactant or blends thereof.

Preferred non-ionic surfactants are fatty alcohols (e.g. lauryl alcohol, cetyl alcohol or stearyl alcohol); partial fatty acid esters of multivalent alcohols (e.g. glycerol monostearate, ethoxylated sorbitol stearate or oleic acid ethoxylate); sorbitan esters of fatty alcohols (e.g. sorbitan monopalmitate); polyethyleneglycol ethers (PEG) (e.g. PEG-200 lauryl ether); polyethyleneglycol fatty acid esters (e.g. PEG-400 stearate); or PEG-sorbitan fatty acid esters (e.g. PEG-200-sorbitan monostearate).

Preferred anionic surfactants are alkali soaps (e.g. sodium palmitate); amine soaps (e.g. triethanolamine oleate); alkyl sulphates (e.g. sodium lauryl sulphate); or alkyl sulphonates (e.g. sodium dodecyl benzene sulphonate).

Preferred cationic surfactants are quaternary ammonium salts (e.g. lauryl dimethyl benzyl ammonium chloride); or pyridinium salts (e.g. cetylpyridinium bromide).

Preferred amphoteric surfactants are phospholipids (e.g. lecithin); or ampholyte soaps (e.g. betaine).

Further preferably, the phosphite or phosphonite/phenol blend is mixed with at least 5% by weight of the emulsifying agent.

The substantially water-free self-emulsifying stabiliser mixture may be used in combination with other additives, e.g. other stabilisers, other antioxidants, fillers, pigments etc.

In particular, thiosynergists may be used such as dilauryl-3,3'-thiodipropionate (Lowinox DLTDP), Distearyl-3,3'-thiodipropionate (Lowinox DSTDP), ditridecyl-3,3'-thiodipropionate, (beta-laurylthiopropionate) pentaerythritol tetrakis (Naugard 412S).

In contrast to the traditional stabilisation process, the water-free self-emulsifying liquid stabiliser/antioxidant/emulsifying agent mixture of the present invention is directly injected into the polymer or copolymer latex prior to coagulation without any pre-treatment. The stabilisation process of the invention does not require a separate vessel for heating the mixture of the stabiliser/antioxidant blend with the emulsifying agent. Also, there is no requirement for vessels for emulsion preparation as well as the heating of emulsion compounds and the emulsion preparation itself. By injecting the water-free self-emulsifying liquid stabiliser/antioxidant/emulsifying agent mixture directly into the polymer latex at the end of the polymerization stage, the mixture is quickly, easily and homogeneously emulsified into the polymer latex. Furthermore, during the subsequent coagulation stage, the liquid stabiliser/antioxidant blend is absorbed into the polymer providing it with outstanding long term stability. Moreover, when using traditional aqueous oil-in-water emulsion stabilisers it is necessary to add the salt of the fatty acid emulsifying agent and KOH or NaOH in order to form a soap which acts as the emulsifier. In contrast, the emulsifying agent is already contained in the stabilising mixture of the invention.

The preferred self-emulsifying stabiliser mixture of the invention comprises a blend of a liquid phosphite stabiliser and a liquid phenolic antioxidant. To this blend there is added approximately 10% by weight of a solid emulsifier in order to obtain a liquid stabiliser mixture which is easy to be emulsified in the polymer latex as soon as the stabiliser mixture is added to the latex. A major advantage of the stabilising process of the invention is that there is no requirement to prepare "mother" emulsions which saves time and money because there is no need for the polymer compounder to prepare his own fatty acid soap emulsifier.

Antioxidants/Stabilisers/Emulsifying Agents
(a) Preferred phenolic antioxidants are:
Liquid phenol—Anox 1315 (CAS 171090-93-0)—a mixture of $C_{13}$ to $C_{15}$ linear and branched alkyl esters of 3-(3',5'-di-t-butyl-4'-hydroxyphenyl)propionic acid. Another possible liquid phenolic antioxidant is Irganox 1135 (octyl 3-(3',5'-di-t-butyl-4'-hydroxyphenyl)propionate).
(b) The preferred stabiliser is the liquid phosphite-Alkanox TNPP (CAS 26523-78-4)—Tris(4-n-nonylphenyl)phosphite.
(c) Preferred emulsifying agents are ethoxylated sorbitol stearate and oleic acid ethoxylate.

A most suitable stabiliser package is (a) Anox 1315 (1 part) to Alkanox TNPP (2 parts)—89% by weight and (b) ethoxylated sorbitol stearate—11% by weight. The components are mixed together at 40° C.

Anox, Alkanox and Lowinox are registered trade marks of Great Lakes Chemical Corporation (a Chemtura company).

Naugard is a registered trade mark of Crompton Corporation (a Chemtura company).

Irganox is a registered trade mark of Ciba.

An embodiment of the invention will now be described by way of example with reference to what is known as the "cold SBR polymerisation process".

Styrene, butadiene, water, catalyst (p-methane-hydroperoxide or other organic peroxides), activator (ferrous sulphate), modifier (alkyl mercaptan) and other ingredients are fed at a controlled rate to the polymerisation reactors which are agitated, jacketed, internally cooled vessels arranged in series.

At 5° C., 60% conversion to polymer occurs in eight (8) to twelve (12) hours. The polymerisation reaction is stopped by the addition of a chain stopping agent (sodium dimethyldithiocarbanate in aqueous solution or other water soluble reducing agent such as hydroquinone or hydroxylamine derivatives and a solution of sodium polysulphide) to the reaction stream as it leaves the reactors. Unconverted butadiene is removed by, flashing, first at slight pressure, then under vacuum. Unconverted styrene is removed under steam stripping in a vacuum column. The liquid stabiliser/antioxidant/emulsifier blend of the invention is added to the latex at room temperature and then the latex is coagulated by the addition of either acids (e.g. sulphuric acid) and/or solution of water soluble inorganic salts such as aluminium sulphate. Finally, the copolymer crumbs are filtered, washed, dried, baled and packed.

The "hot SBR emulsion polymerisation process" is very similar to the "cold process" described above except that the polymerisation normally takes place at 50° C. without the catalyst activator. Again, the liquid stabiliser/antioxidant/emulsifier blend of the invention is added to the process at room temperature.

The stabiliser system of the present invention gives rise to many advantages over the stabiliser systems used in traditional processes. These advantages include the following:
1) A low viscosity self-emulsifying liquid in easy to handle physical form.
2) An "all in one" stabilisation system.
3) Easy to dose.
4) Immediate emulsion in the latex.
5) Improves latex stability.
6) No interference in coagulation of the polymer.
7) Homogeneous dispersion in the polymer.
8) Improves the "in process" stability of the polymer.
9) Improves the long term stability of the polymer.
10) Low equipment procurement costs.

11) Single tank for all the system.
12) One single dosing device.
13) No costs of "mother" emulsion.
14) No segregation or sedimentation.
15) One single addition point into the latex.
16) No formation of lumps in storage.
17) No premature coagulation.

The invention claimed is:

1. A process for stabilising a natural or synthetic organic polymer or copolymer obtained from a water based latex or emulsion of the polymer or copolymer comprising adding to the latex or emulsion prior to the coagulation of the polymer a substantially water-free self-emulsifying liquid stabiliser mixture comprising (a) a phosphite or phosphonite stabiliser; (b) a phenolic antioxidant and (c) an emulsifying agent,
wherein the ratio of phosphite or phosphonite stabiliser to the phenolic antioxidant in the liquid stabilizer mixture is about 2:1 parts by weight.

2. A process as claimed in claim 1 wherein the phosphite or phosphonite stabiliser and the phenolic antioxidant are liquid at room temperature, molten between 50 and 120° C. or are used in solution.

3. A process as claimed in claim 2 wherein the phosphate stabiliser is liquid at room temperature and is selected from the group consisting of:
Tris nonylphenyl phosphite
Tris dinonylphenyl phosphite
2,4-Dinonylphenyl bis(4-nonylphenyl)phosphite
Triphenyl phosphite
Tris(methylphenyl)phosphite
Diphenyl isodecyl phosphite
Phenyl diisodecyl phosphite
Triisodecyl phosphite
Diphenyl isooctyl phosphite
Phenyl diisooctyl phosphite
Triisooctyl phosphite
Tri(tridecyl)phosphite
Tristearyl phosphite
Trilauryl phosphite
2-Butoxyethyl diisodecyl phosphite
2-Ethylhexyl diphenyl phosphite
Tri 2-ethyhexyl phosphite
Bis(2-ethylhexyl)nonylphenyl phosphite
Tetraphenyl dipropylene glycol diphosphite
Tris(dipropylene glycol)phosphite
Poly(dipropyleneglycol)phenyl phosphite
Alkyl($C_{12-15}$)bisphenol A phosphite,
and Alkyl($C_{10}$)bisphenol A phosphite 4. A process as claimed in claim 2 wherein the phosphonite stabiliser is Tetrakis(2,4-di-tert-butylphenyl)4,4'-diphenylene diphosphonite melting in the range 75° C. to 95° C.

5. A process as claimed in claim 1 wherein the phenolic antioxidant is liquid at room temperature and is a mixture of $C_{13}$-$C_{15}$ linear and branched alkyl esters of 3-(3',5'-di-t-butyl-4'-hydroxyphenyl)propionic acid, octyl 3-(3',5'-di-t-butyl-4'-hydroxyphenyl)propionate, 2,2'-methylene bis(4-methyl-6-nonylphenol), 2,6-bis(alpha-methylbenzyl)-4-methylphenol, styrenated phenol (mixture of mono-, di- and tri), or 2,4-dimethyl-6-(1-methylpentadecyl)phenol and tocopherols.

6. A process as claimed in claim 1 wherein the phenolic antioxidant is a soluble antioxidant and is 1,1,3-Tris(2'-methyl-4'-hydroxy-5'-t-butylphenyl)butane, a polymeric sterically hindered phenol, or octadecyl 3-(3',5'-di-t-butyl-4'-hydroxyphenyl)propionate.

7. A process as claimed in claim 1 wherein the emulsifying agent is a non-ionic surfactant, an anionic surfactant, a cationic surfactant or an amphoteric surfactant or blends thereof.

8. A process as claimed in claim 7 wherein the non-ionic surfactant is selected from the group consisting of fatty alcohols, partial fatty acid esters of multivalent alcohols, sorbitan esters of fatty alcohols, polyethyleneglycol ethers, polyethyleneglycol fatty acid esters and polyethyleneglycol sorbitan fatty acid esters.

9. A process as claimed in claim 8 wherein the emulsifying agent is ethoxylated sorbitol stearate or oleic acid ethoxylate.

10. A process as claimed in claim 7 wherein the anionic surfactant is an alkali soap, an amine soap, an alkyl sulphate or an alkylsulphonate.

11. A process as claimed in claim 7 wherein the cationic surfactant is a quaternary ammonium salt or a pyridium salt.

12. A process as claimed in claim 7 wherein the amphoteric surfactant is a phospholipid or an ampholyte soap.

13. A process as claimed in claim 1 wherein the phosphite or phosphonite/phenol blend is present in the dry polymer in an amount between 0.3 and 5% by weight.

14. A process as claimed in claim 13 wherein the phosphite or phosphite/phenol blend is present in the dry polymer in an amount between 0.3 and 1% by weight.

15. A process as claimed in claim 1 wherein the phosphite or phosphonite/phenol blend is mixed with at least 5% by weight of the emulsifying agent.

16. A process as claimed in claim 1 wherein the substantially water-free liquid self-emulsifying stabiliser mixture is used in combination with other additives.

17. A process as claimed in claim 1 wherein the organic polymer is selected from aqueous emulsions of natural or synthetic rubbers such as latex or latexes based on carboxylated styrene-butadiene copolymers.

18. A process as claimed claim 1 wherein the organic polymer is selected from the group consisting of natural or synthetic rubber such as acrylic rubbers, polyisoprene, polybutadiene, polychloroprene, styrene/butadiene rubber and EPDM.

19. An article comprising a natural or synthetic polymer or copolymer obtained from the process of claim 1.

* * * * *